No. 742,835. PATENTED NOV. 3, 1903.
I. G. CARMACK.
BACK BAND HOOK.
APPLICATION FILED MAR. 25, 1903.
NO MODEL.

Witnesses
E. F. Stewart
C. N. Woodward

I. G. Carmack, Inventor.
by C. A. Snow & Co.
Attorneys

No. 742,835. Patented November 3, 1903.

UNITED STATES PATENT OFFICE.

IRVING G. CARMACK, OF VIENNA, GEORGIA.

BACK-BAND HOOK.

SPECIFICATION forming part of Letters Patent No. 742,835, dated November 3, 1903.

Application filed March 25, 1903. Serial No. 149,569. (No model.)

*To all whom it may concern:*

Be it known that I, IRVING G. CARMACK, a citizen of the United States, residing at Vienna, in the county of Dooley and State of Georgia, have invented a new and useful Back-Band Hook, of which the following is a specification.

This invention relates to attachments to harness employed in plowing and for similar purposes, and has for its object to provide a simple and improved device for supporting the traces in proper position relative to the draft-animals to produce the minimum of strains and to cause the plow to cut a predetermined depth of furrow and likewise for supporting the driving-reins and preventing entanglement thereof.

Another object of the invention is to produce a device which may be readily adjusted to adapt it to animals of various sizes; and the invention consists in certain novel features of construction, as hereinafter shown and described, and specified in the claims.

Figure 1:
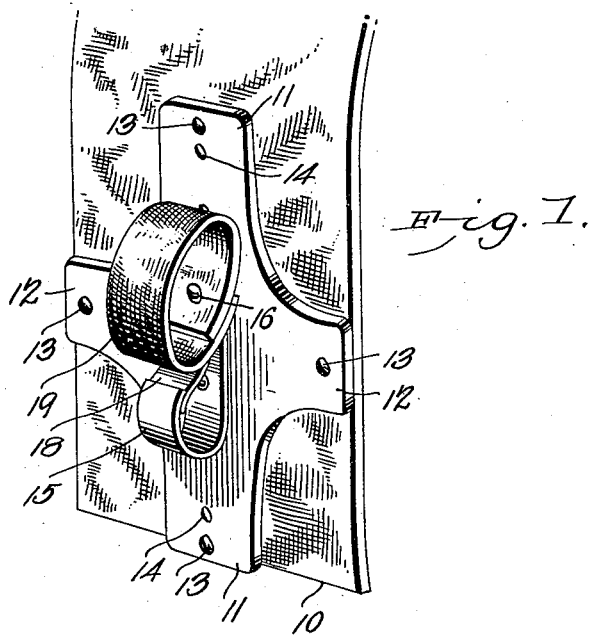
Figure 3:
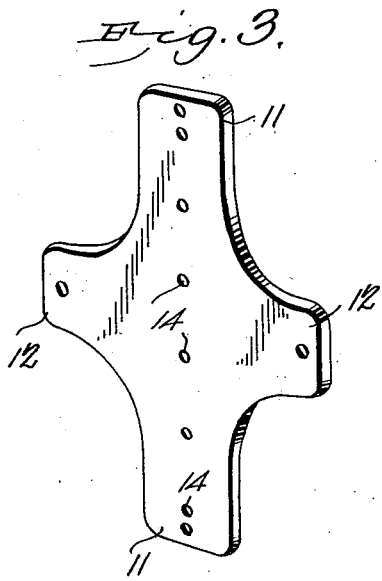
Figure 2:
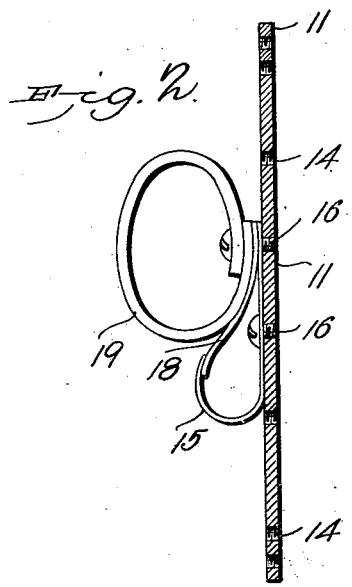

In the drawings illustrative of the invention, in which corresponding parts are denoted by like designating characters, Figure 1 is a perspective view of the device applied. Fig. 2 is a side elevation.

The improved device is attachable preferably to a back-band, portions of which are indicated at 10.

The improvement consists of a base-plate of any approved form, but preferably in the shape shown, with a longitudinal central portion 11 and lateral extensions 12 and secured to the back-band portion 10, as by rivets 13.

The longitudinal portion 11 of the base is provided with a plurality of spaced apertures 14 to provide for the adjustable connection of the trace and rein-holder portions, so that the latter may be adapted to the size of the draft-animals. The trace-supporting means consists of a hook 15, connected to the base portion by spaced bolts or screws 16, as shown, and by engaging the bolts interchangeably with the apertures 14 the angle of the traces may be altered to any desired extent to adapt them to the size of the draft-animal.

Attached to the base-plate is a guard-spring 18, serving to close the throat of the hook and prevent the accidental release of the trace-chain. The trace-chain may be snapped into the hook by the repression of the spring and may be released when required by a similar operation.

Attached to the device, preferably by the upper one of the bolts 16, is a rein-carrying loop 19, said upper bolt being the common means for attaching the hook, spring, and loop to the base-plate.

The loop 19 is preferably of leather, but may be of metal or other material.

The base-plate 11 12 may be of metal or leather, as preferred, and of sufficient strength to withstand the strains to which it will be subjected. By this simple arrangement a very compact, cheap, and durable combined trace-carrier and rein-guide is produced, which may be readily adjusted to the size of the animal and which will not only support the traces in proper position relative to the line of draft, but will also prevent the reins from becoming entangled with the harness-traces or other parts.

The parts may be modified in minor particulars without departing from the principle of the invention or sacrificing any of its advantages.

Having thus described the invention, what I claim is—

1. An attachment for harness consisting of a base-plate, a trace-supporting hook, a spring forming a yieldable closure for said hook, a rein-carrying loop, and a common bolt securing said hook, spring and loop to the base-plate.

2. An attachment for harness consisting of a base-plate adapted for attachment to the harness and having a plurality of spaced apertures, a trace-supporting hook adjustably secured by bolts interchangeably engaging said apertures, a spring connected by one of said holding-bolts and forming a yieldable closure to said hook, and a rein-carrying loop connected to said base by the same bolt which secures said hook and spring, whereby said hook, spring and loop may be adjusted upon said plate, substantially as specified.

In testimony that I claim the foregoing as my own I have hereto affixed my signature in the presence of two witnesses.

IRVING G. CARMACK.

Witnesses:
E. HOWELL,
O. S. BAZEMARE.